Figure 1:
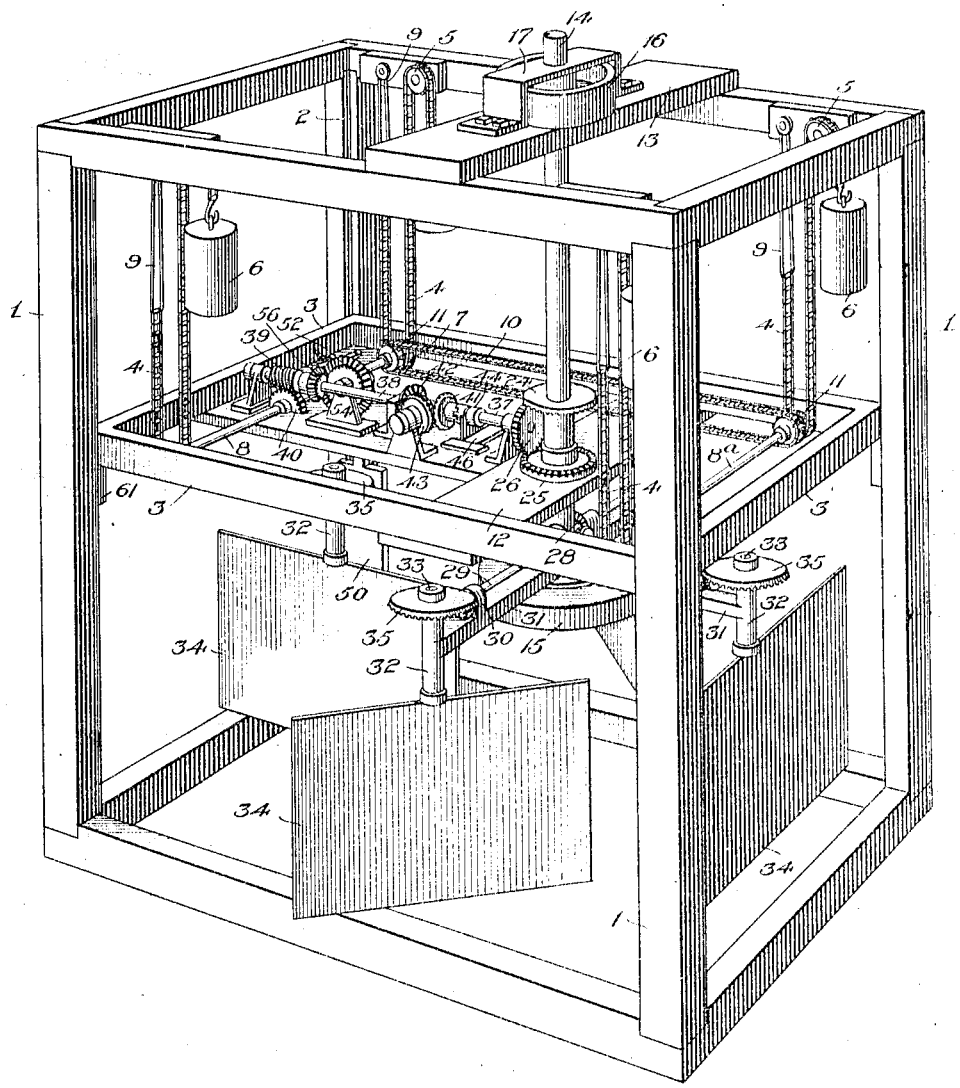

D. S. HIBBARD.
WATER WHEEL.
APPLICATION FILED JUNE 25, 1910.

989,149.

Patented Apr. 11, 1911.
4 SHEETS—SHEET 1.

Witnesses
Edwin L Bradford
C. J. Babcock

Inventor
David S Hibbard
By W H Babcock
Attorney

D. S. HIBBARD.
WATER WHEEL.
APPLICATION FILED JUNE 25, 1910.
989,149.
Patented Apr. 11, 1911.
4 SHEETS—SHEET 2.
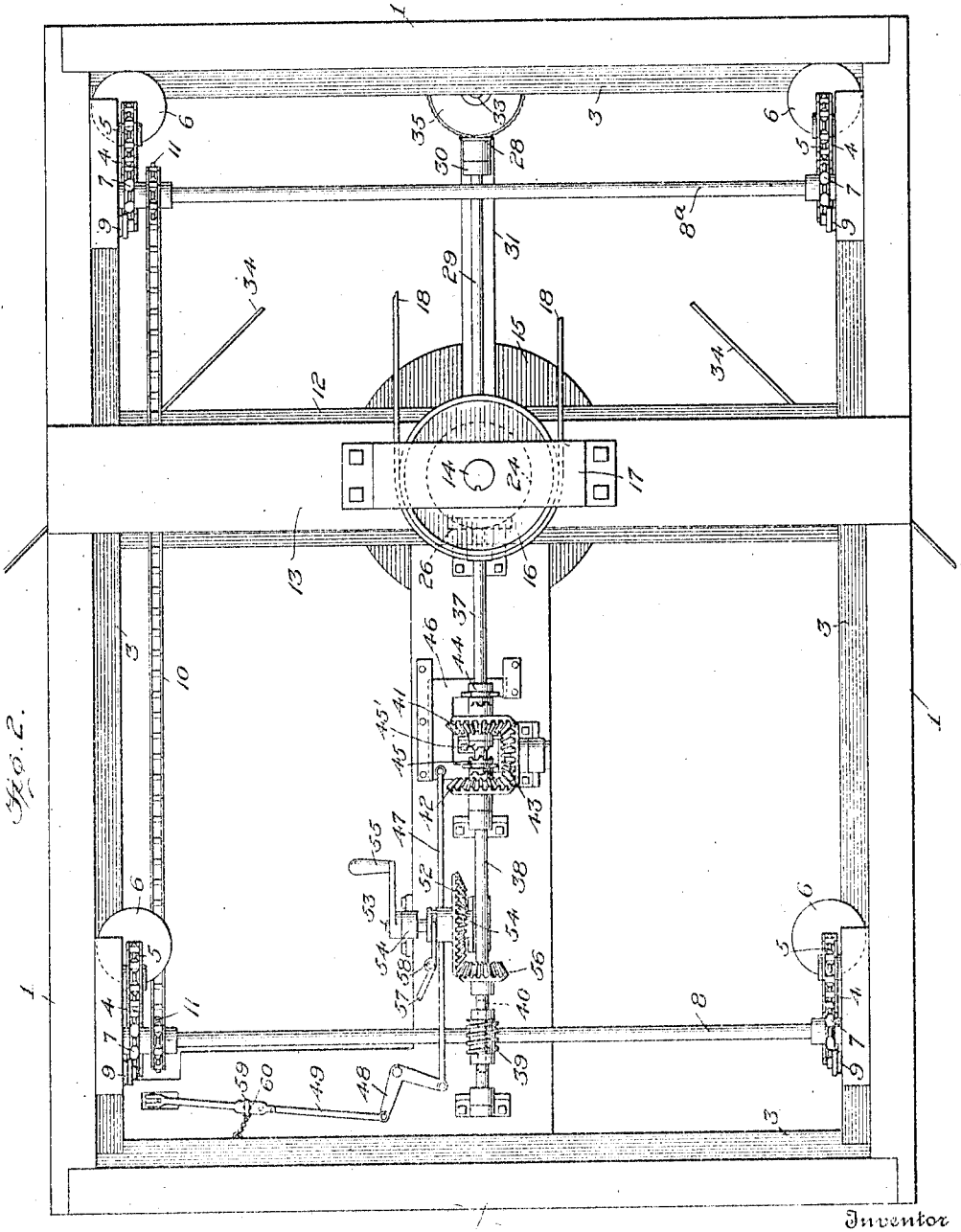
Witnesses
Edwin L. Bradford
C. J. Babcock
Inventor
David S. Hibbard
By W. H. Babcock
Attorney

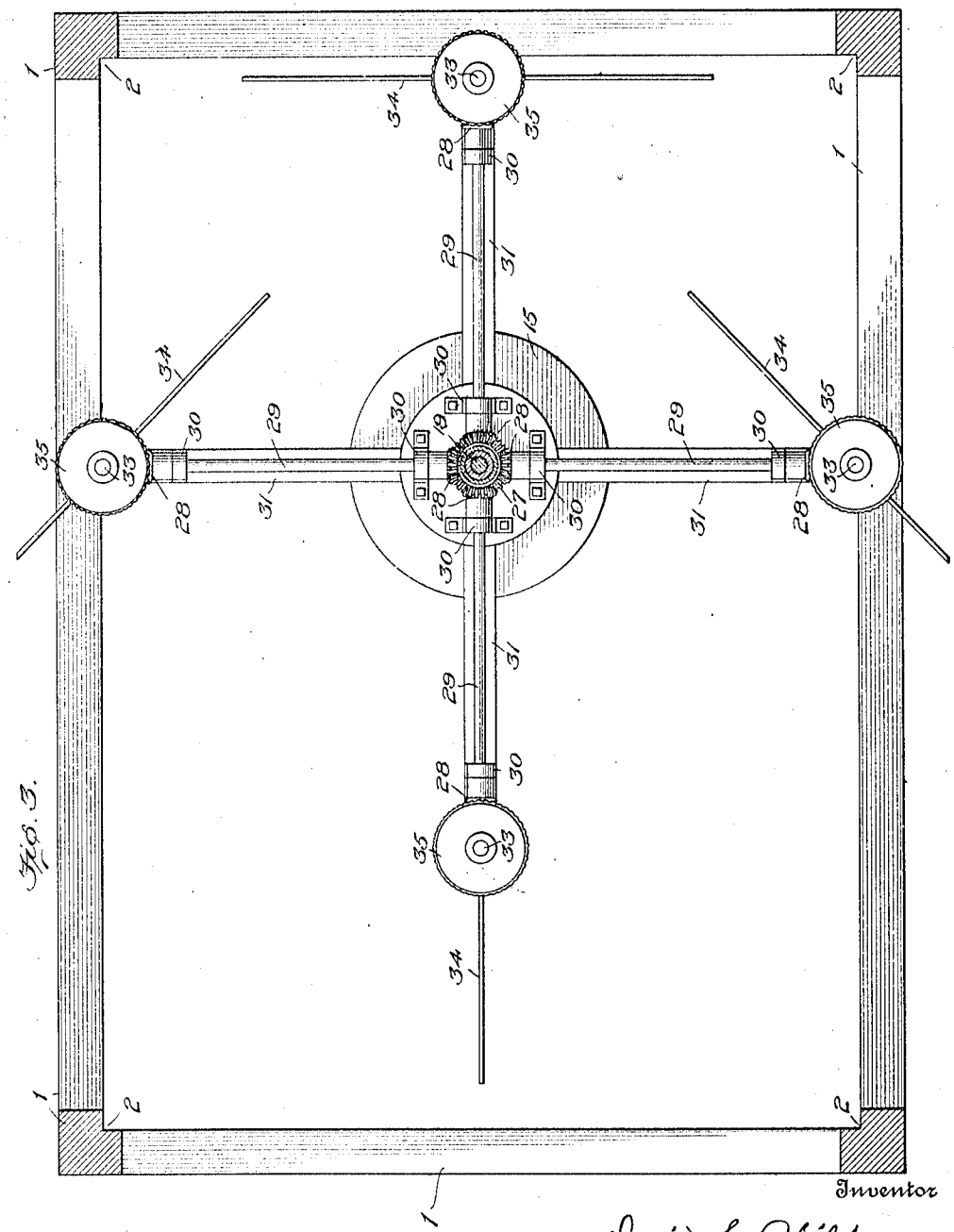

D. S. HIBBARD.
WATER WHEEL.
APPLICATION FILED JUNE 25, 1910.
989,149.
Patented Apr. 11, 1911.
4 SHEETS—SHEET 4.
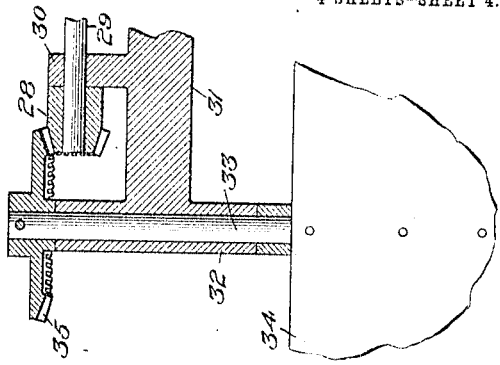
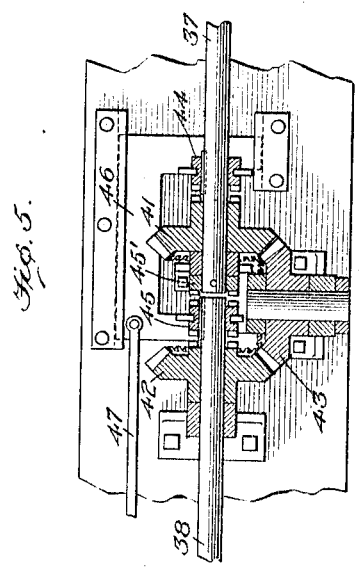
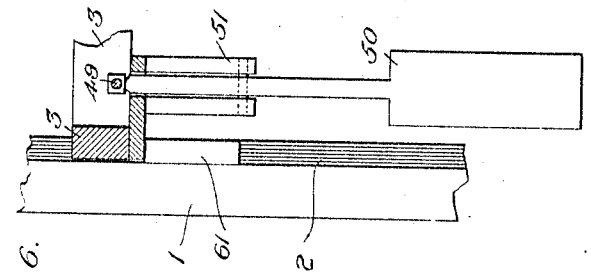
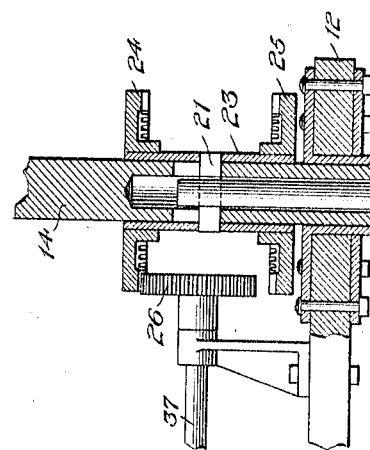
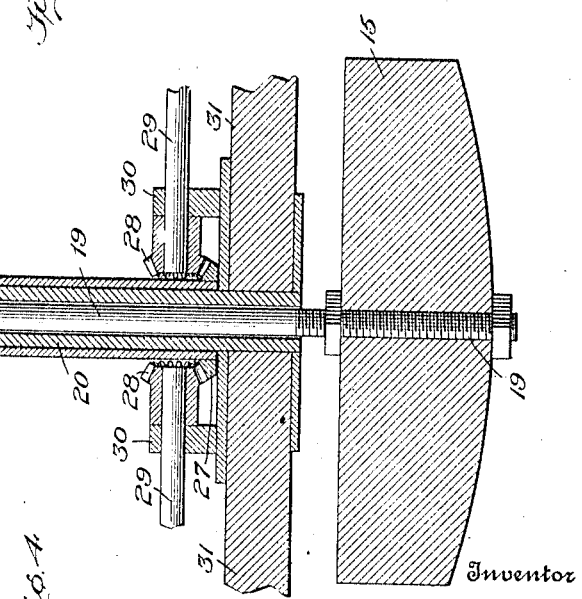
Witnesses
Edwin L. Bradford
C. F. Babcock
Inventor
David S. Hibbard
By W. H. Babcock
Attorney

UNITED STATES PATENT OFFICE.

DAVID S. HIBBARD, OF GORHAM, MAINE.

WATER-WHEEL.

989,149. Specification of Letters Patent. Patented Apr. 11, 1911.

Application filed June 25, 1910. Serial No. 568,853.

*To all whom it may concern:*

Be it known that I, DAVID S. HIBBARD, a citizen of the United States, residing at Gorham, in the county of Cumberland and State of Maine, have invented certain new and useful Improvements in Water-Wheels; and I do hereby declare the following to be a full, clear, and exact description of the invention, such as will enable others skilled in the art to which it appertains to make and use the same.

This invention relates to water-wheels especially adapted to be used in and with tidal currents, but also available in streams above tide water; such wheels being of the kind that use a series of feathering paddles turning an upright power shaft.

The chief objects of the invention are to keep the wheel in its most advantageous position, that of partial immersion at the surface of the water, by automatically compensating for its rise and fall and also for the reversal of the current, as by turn of the tide; also to maintain such relations between the power shaft and the driving pulley or equivalent means thereon as will insure the transmission of power most conveniently and at the best advantage notwithstanding such rising and falling of the wheel and shaft; to improve the construction and operation of the wheel and neighboring parts; to insure the perfect horizontal position of the supporting platform as it rises and falls; to, relieve the adjusting mechanism of the strain of the weight and motion of said platform; to increase the accuracy, convenience and compactness of the float and the parts operated thereby for automatic adjustment to change a rising movement of the platform to a falling one or vice versa; and generally to improve the details of the mechanism.

To these ends the said invention consists in the construction and combination of parts hereinafter more particularly set forth and described and claimed.

In the accompanying drawings: Figure 1 represents a perspective view of the mechanism embodying my invention; Fig. 2 represents a plan view of the same; Fig. 3 represents a cross-section looking downward, taken just above the paddle shafts; and Figs. 4 to 7 represent detail views.

A partly immersed rectangular fixed frame 1 has in the inner faces of its vertical corner posts four angular vertical guide grooves 2, in which the corners of a rectangular platform 3 move up and down, said platform being suspended by four chains 4 passing over sprocket wheels 5 on the upper part of said frame and provided with terminal counterbalance weights 6 which relieve from strain the adjusting mechanism hereinafter described. The said chains pass under sprocket-wheels 7 on and turning with two transverse suspending shafts 8, 8ª journaled in said platform and rotated as hereinafter explained, one of these sprocket wheels being in the bight of each chain 4. The other end of each chain is hung by a link 9 to the upper part of frame 1. An endless chain 10 engaging another pair of sprocket wheels 11 on and turning with said shafts 8 and 8ª allows the former when turned to drive the latter at the same rate of speed and in the same direction; it also restricts their turning to the same speed as the said shafts are turned by the action of the suspending chains 4 and their weights 6, consequently the four corners of the rectangular platform are kept in the same horizontal plane as they move up and down in the vertical guideways of the frame and the wheel, power shaft and other mechanism rising and falling with said platform remain in their normal positions, horizontal or vertical as the case may be. Cross bar 12 of this platform and 13 of frame 1 have bearings for the power shaft 14, which rises and falls with said platform, though extending through it, but slides freely through the bearing in the fixed upper bar 13, also through a drive wheel or pulley 16, held to the top of the latter by a strap or frame 17, but adapted, by spline and groove or otherwise, to turn with said shaft. Whatever the vertical position of the power shaft, wheel and platform, the said pulley is therefore always at the same elevation, chosen for greatest convenience and efficiency in driving, through belt 18 or otherwise, any suitable mechanism on shore.

The float 15, which governs the adjusting devices, to change the action of the lifting mechanism according to the rise and fall of the tide, is located wholly within the frame 1 and directly under the said power shaft and the middle of the water wheel, being quite out of the way of the paddles as they revolve. Said float carries a rod 19 extending telescopically upward into the tubular lower part 20 of shaft 14 and is provided with a bar 21, the arms of which protrude through two opposite vertical slots of said power shaft and carry a sleeve 23, sliding vertically on the latter, said sleeve being provided with two crown gear wheels 24 and 25 facing each other, with an interval between them greater than the diameter of the adjusting gear-wheel 26 with which they alternately engage. It is possible, however, for the wheels to be quite out of engagement, the rising or falling of the sleeve not then being sufficient to bring either wheel 24 or wheel 25 into mesh with wheel 26.

At the lower end of power shaft 14 is a concentric crown gear wheel 27, not turning with said shaft, being fixed to its support, and engaging bevel-wheels 28 on the inner ends of a series of radial horizontal shafts 29 journaled in bearings 30 on corresponding rigid arms 31, constituting a supporting spider frame, the hub of which is fixed on said power shaft; and the outer ends of said arms are provided with additional bearings 32 for vertical paddle-shafts 33, each of which is provided at its lower end with a vane or paddle 34 and at its upper end with a crown-wheel 35, meshing with the proximate bevel wheel 28 on the outer end of the corresponding shaft 29. The gearing is calculated to give each paddle 34 a half revolution of absolute motion while the shaft 14 and the series of paddle-wheels as a whole make one complete revolution in the same direction. This I call a half speed planetary motion and its object is to feather the paddles so that they will get the maximum advantage from the current and incur the least impediment as each paddle reaches a point where the effective beneficial action ceases and should return as easily as possible to its first position. The paddles are so arranged that by the application of this motion the following positions are successively given them: The first quarter of its revolution with the main shaft across the current and its independent simultaneous turning through one-eighth of a revolution will present it at an angle of 45 degrees to the current, receiving the pressure thereof on its back; the next equal period of rotary movement will bring it half around the circle described by the series and edge on to the tide offering no resistance; the next equal movement will bring it across the tide and give it a position of 45 degrees, so that the action of the current on it will again aid the rotary movement of the shaft, and the next equal movement will return this paddle to its first position across the current. The power of the tide is thus applied to the very best advantage through the series of feathering paddles. When the tide is at a standstill and the paddles are in their proper position of partial immersion, the adjusting wheel 26 is in the space between the crown-wheels 24 and 25 and not engaged by either of them. When the tide rises, the float 15 rises too carrying up the lower crown-wheel 25, which engages said wheel 26, turning the shaft 37 of the latter so that it will normally automatically rotate the platform-supporting shaft 8, through suitable connections, so as to act on the suspending chains 4 to raise the same by the aid of the counterbalance weights. When the tide falls and the float descends the upper crown wheel 24 is brought similarly into engagement instead, and the shafts 37 and 8 are turned in the opposite direction lowering the said platform. In each instance the upward or downward movement is just enough to compensate for the tidal change and keep the paddles automatically in the proper position of partial submergence above stated.

A convenient series of connections between shafts 37 and 8 is shown in the drawings, consisting of shaft 38, preferably in alinement with shaft 37 and carrying a worm 39, which engages a worm-wheel 40 on shaft 8, a pair of normally loose bevel wheels 41 and 42 facing each other on the proximate ends of shafts 37 and 38, a bevel wheel 43 on a fixed bearing, making connection between them, sliding clutches 44 and 45 feathered on said shafts and engaging clutch faces of said wheels and a sliding bracket 46, engaging both of said clutches and moving them simultaneously in either direction longitudinally of said shafts. These clutches being moved into engagement with both of said wheels, the whole series of wheels and shafts from wheel 26 to shaft 8 will turn with the automatic compensating action above stated, so long as the tide moves in the right direction, or permanently when the wheel is used in a stream above tide water. But when the tide turns and the paddles and main shaft reverse their motion some automatic reversing means becomes necessary, to prevent the platform from rising when it should fall and vice versa. For this purpose the clutches and loose wheels are employed, the clutch 45′ on shaft 38 is given a double clutch face fitting it to engage the correspondingly formed proximate face of the bevel wheel 42 on that shaft or that of a collar 45 formed on the proximate end of shaft 37; a long pitman 47 is made to connect sliding bracket 46 to a horizontal bell-crank lever 48 on platform 3 and a rod 49 is employed to connect the other arm of said lever to the upper end of depending reversing paddle 50, which is pivoted in a fixed bracket 51 on the under side of a horizontal bar of said platform. When the tide moves one way it will carry with it for a short distance this paddle, which does not feather, causing it to pull on the bell-crank lever; when the tide goes the other way it will carry the paddle back an equal distance causing it to push said bell-crank lever turning it the other way. Obviously the clutches will be automatically shifted in reverse directions and held in their new positions of engagement by tidal pressure until the turn of the tide. When the clutches move to their most outward position both of the bevel wheels 41 and 42 are engaged by them and the shaft 37 turns the shaft 38 in the direction opposite to its own; when the two clutches are shifted into their most inward position one of them engages the collar 45 (the other being disengaged), so that the two shafts turn together in the same direction, as if they were one shaft. If the pressure of the tide be light it may move the clutches only far enough to give them an intermediate position, disengage them altogether and render them inoperative, but this condition will not continue long and the depth of the rotary paddles and operation of the wheel will not be appreciably affected.

A bevel cogged hand wheel 52, feathered on a short shaft 53, which is journaled in a support 54 and rotated by a crank 55, engages at will a bevel wheel 56 fast on shaft 38, so that turning this crank during such connection will rotate shafts 38 and 8 in either direction, to raise or lower the platform, float and mechanism. This device affords a convenient means of compensating for slight errors in adjustment and of raising the machinery for cleaning and repairs or as may otherwise be needed. A lever 57 pivoted on a standard 58 for horizontal movement, shifts at will the above mentioned wheel 52 into or out of engagement with wheel 56. In the latter case it of course has no effect. The support 54 and standard 58 are fixed to the platform, being preferably mounted on the same bar which supports the shafts 37 and 38.

The reversing mechanism hereinbefore described as compensating for the changed direction of the current is shown in detail, as some species of such mechanism must be shown under the rules to illustrate mechanism operative in both movements of the tide; but I do not claim the construction and combination thereof in this application, being aware that it constitutes a mechanical movement of general availability which may form the subject matter of a separate application. It is obvious that for present purposes divers other forms of reversing mechanism may be used instead.

As in the case of the adjusting mechanism described, the clutches of the reversing mechanism may be moved just far enough by the immersed paddle to disengage both of the bevel wheels 41 and 42 and also the collar 45', and the clutches and paddle may be locked at will in this position by any convenient device, for example a pin 59 passing into the platform through a hole 60 in any part of the devices connecting said paddle to said reversing mechanism. The downward movement of the platform 3 is limited by stops 61 on said frame 1.

The operation has already been described in detail. When the water rises, the platform ascends and vice versa; and when the current is reversed a similar reversal of the movement of the mechanism takes place, the water wheel being kept always at the surface and partly immersed. While this wheel and its power shaft thus rise and fall with the water the driving pulley splined on said shaft remains immovable except for rotation and thus readily communicates motion without strain to the mechanism ashore. Assuming the tide to be first moving toward the side of the platform on which the depending paddle 50 is fixed, this paddle is carried away from the center of the mechanism, and its top above the pivot is carried toward the center, pushing the rods and holding the clutch 45 in engagement with the collar so that the adjusting shafts 37 and 38 must revolve together as if they were one until the tide turns; and when the tide turns the bottom of the paddle is carried toward the center of the mechanism and the top from the center, pulling the connecting rods, releasing the engagement of the collar and holding both clutches in engagement with their wheels, so as to cause the two adjusting shafts to revolve in opposite directions.

Having thus described my invention, what I claim as new and desire to secure by Letters Patent is:

1. In combination with a water wheel and a power shaft driven thereby, a vertically movable platform on which said shaft is mounted, flexible chains and pulleys whereby said platform is suspended evenly at its corners from said frame, said water-wheel and power shaft rising and falling with said platform.

2. In combination with a water wheel and a vertical power shaft driven thereby, a wheel for transmitting power from said shaft and held to a single position of elevation although said shaft is free to move up and down through it, a vertically movable platform arranged to carry up and down said shaft and water wheel, flexible means of suspension for said platform, wheels which said means of suspension pass around and counterbalance weights applied to said means of suspension, the said means and weights being arranged to hold the said frame horizontal and permit its rising and falling with the water.

3. In combination with a frame arranged for partial submergence and provided with four vertical guideways, a platform having its corners fitting said guideways and movable up and down therein, counterbalance weights, chains and pulleys whereby said platform is suspended evenly at its corners from said frame and a water-wheel and power shaft rising and falling with said platform.

4. In combination with a vertically movable platform and a water wheel and power shaft rising and falling therewith, a pair of transverse parallel rotary shafts mounted in the said platform, sprocket wheels on said shafts near the corners of said platform, additional sprocket wheels above them on the frame, chains attached to said frame passing under the former sprocket wheels and over the latter ones, counterbalance weights on the free ends of said chains and connections between the said shafts compelling them to turn at the same rate of speed, thus preserving the horizontal position of the platform.

5. In combination with a fixed frame having vertical guideways, a rectangular platform guided evenly at the corners in said guideways, counterbalance weights and suitable flexible connections for aiding the raising and permitting the gradual lowering of said platform, a pair of rotary horizontal shafts mounted in said platform and each provided near its ends with a pair of wheels engaging such flexible connections, additional wheels on said shafts and an endless connecting chain between them to compel the equal speed of rotation of said shafts and a water wheel and power shaft rising and falling with said platform, the arrangement of said weights and connections insuring the even horizontal position of said platform in any vertical position which it may occupy.

6. In combination with a water wheel, its power shaft and a horizontal platform supporting these parts and rising and falling therewith, a shaft mounted in said platform, adjusting devices for driving this latter shaft from the power shaft to raise and lower the platform, an additional rotary shaft also mounted in the said platform and geared to the former shaft to turn therewith, wheels on said shafts and suspending chains receiving these latter wheels in their lower bights, the said chains being provided with counterbalance weights to take the strain of the weight of the platform and parts supported thereby off from said adjusting devices substantially as set forth.

7. In combination with a water wheel comprising several paddles and a power shaft and supporting platform rising and falling with said wheel, a float arranged under the shaft and central part of the wheel and out of the way of the paddles and having limited vertical motion independent of said platform, a shaft driven by the power shaft, gearing and suspending devices operated thereby for raising and lowering said platform, reversible adjusting devices between said shafts and shifting means operated by the rising and falling of said float for changing the vertical motion of said platform.

8. In combination with a water wheel, a power shaft operated thereby and having a tubular lower part, vertically slotted, and a platform rising and falling with said wheel and shaft, a float arranged under said wheel and shaft, a rod carried by said float, extending telescopically up within said shaft and having a part which protrudes through the slotted portion thereof, a sleeve carried up and down by this protruding part and provided with a pair of facing wheels, an adjusting shaft mounted on said platform, a wheel mounted on and turning with said shaft and arranged to be engaged by either one of said facing wheels according to the position of said sleeve and turned accordingly either to the right or left thereby, a pair of suspending shafts geared to turn together, flexible suspending devices engaged by these suspending shafts in order that said platform may rise or fall retaining its horizontal position and gearing between said adjusting shaft and one of the suspending shafts whereby the latter may be turned in one direction or the other according to the vertical position of said float.

9. In combination with a water wheel, a power shaft operated thereby and having a vertically slotted tubular lower portion, a float located under said shaft and wheel, a rod carried by said float, extending up within said power shaft and having a part which protrudes through the slotted portion of the latter, a sleeve on the power shaft carried up and down by said protruding part and provided with a pair of facing gear wheels, an adjusting shaft having a gear wheel arranged to engage either of said facing wheels according to the position of said float, the latter rising and lowering as the water begins to rise or fall, said shifting gear being also adapted to be automatically disconnected, leaving the platform and supported parts without vertical motion while the water is at the same height.

10. In combination with a water wheel, a power shaft operated thereby and having a vertically slotted tubular lower portion, a float located under said shaft and wheel, a rod carried by said float, extending up within said power shaft and having a part which protrudes through the slotted portion of the latter, a sleeve on the power shaft carried up and down by said protruding part and provided with a pair of facing gear wheels, an adjusting shaft having a gear wheel arranged to engage either of said facing wheels according to the position of the sleeve, an additional shaft mounted in said platform, means engaged thereby for raising and lowering said platform according to the direction of rotation of said shaft and gearing between said adjusting shaft and said additional shaft for the transmission of such rotary movement.

11. In combination with a water wheel, its power shaft and supporting platform, means for automatically raising and lowering said platform and supported parts by the rotation of the power shaft, a float arranged under said shaft and wheel, shifting gears operated by said float to change the direction of action of the devices for raising and lowering as the water begins to rise or fall, said shifting gear being also adapted to be automatically disconnected, leaving the platform and supported parts without vertical motion while the water is at the same height.

12. A water wheel, mechanism for automatically raising and lowering the latter and a fixed frame therefor, in combination with adjusting devices for reversing the action of the said raising and lowering mechanism and a float and shifting gear carried thereby arranged to effect such change of action or leave such gear out of engagement according to the height of the water acting on said float, the said float being located under said wheel and wholly within said frame.

13. A vertically movable water wheel, mechanism operated thereby for automatically raising and lowering the same to keep it always at the surface and partly immersed, vertically movable shifting gear for reversing the action of such mechanism as the water rises and falls, a supporting frame and counterbalance chains and weights depending from said frame, such weights serving to take the strain from the operative mechanism, said float being wholly within said frame and under said wheel.

14. A vertically movable water wheel in combination with mechanism operated thereby for automatically raising and lowering said wheel, a float carrying shifting gear for reversing such action and additional reversing mechanism comprising an immersed paddle and arranged to again reverse the action of such mechanism as the direction of the current changes.

15. A vertically movable water wheel and a shaft rising and falling therewith, in combination with mechanism for automatically raising and lowering said wheel comprising a suspending shaft, an adjusting shaft and a gear wheel on the latter, a vertically shifting pair of reversing wheels adapted to mesh with said gear wheel alternately according to position, a float provided with means for carrying said pair of wheels up and down with it and additional reversing devices interposed between said adjusting shaft and suspending shaft and provided with an immersed part in order that a change of direction of current may act on this part to reverse the action of the suspending shaft by means of said interposed devices and thus cause the lowering of the wheel instead of its raising or vice versa to compensate for the reversal of the direction of rotation of the water wheel.

16. In combination with a water wheel and driving shaft, a platform supporting said wheel and shaft and adapted to rise and fall insuring the proper submergence of said wheel, radial arms mounted on said shaft, and bearings on the tops and outer ends of said arms, a gear wheel on said shaft, radial rotary shafts which are mounted on said arms and provided with pinions at both ends, the pinions at their inner ends meshing with said gear wheel, vertical rotary paddle-shafts mounted on the outer ends of said arms and provided with gear wheels engaging the outer pinions of said radial shafts and paddles or vanes on said paddle shafts, the gearing being calculated to give each paddle shaft a half turn during an entire revolution of the whole series of paddles and in the same direction.

17. In combination with a water wheel, its power shaft and a platform rising and falling therewith, mechanism comprising a rotary suspending shaft for raising and lowering said platform, an adjusting shaft, reversible gearing interposed between said power shaft and said adjusting shaft, for changing the raising action to lowering and vise versa, means rising and falling with the water for shifting said reversible gearing and a worm and worm wheel making rotary connection between said adjusting shaft and suspending shaft and guarding by their construction against accidental disengagement.

18. In combination with a water wheel and supporting platform, rising and falling together, mechanism, comprising an elevating shaft mounted on said platform, for raising and lowering the same, an additional shaft mounted on said platform geared to said elevating shaft and provided also with a pinion, a hand-wheel also supported on said platform and movable at will into or out of engagement with said pinion, means for effecting such shifting movement and a crank for turning said hand wheel to raise or lower said platform and water wheel substantially as set forth.

19. In combination with a water wheel and mechanism for automatically raising and lowering the same, reversing mechanism governed by the reversal of direction by the current and a device for locking such reversing mechanism out of action substantially as set forth.

In testimony whereof, I have signed my name to this specification in the presence of two subscribing witnesses.

DAVID S. HIBBARD.

Witnesses:
GEO. W. ROBERTS,
LEWIS R. JOHNSON.